Oct. 11, 1966   R. L. CHENEY   3,278,941
EVENT MARKER GALVANOMETER
Filed Oct. 9, 1963   3 Sheets-Sheet 1

INVENTOR.
ROBERT L. CHENEY
BY
Christie, Parker & Hale
ATTORNEYS.

Oct. 11, 1966    R. L. CHENEY    3,278,941
EVENT MARKER GALVANOMETER
Filed Oct. 9, 1963    3 Sheets-Sheet 2
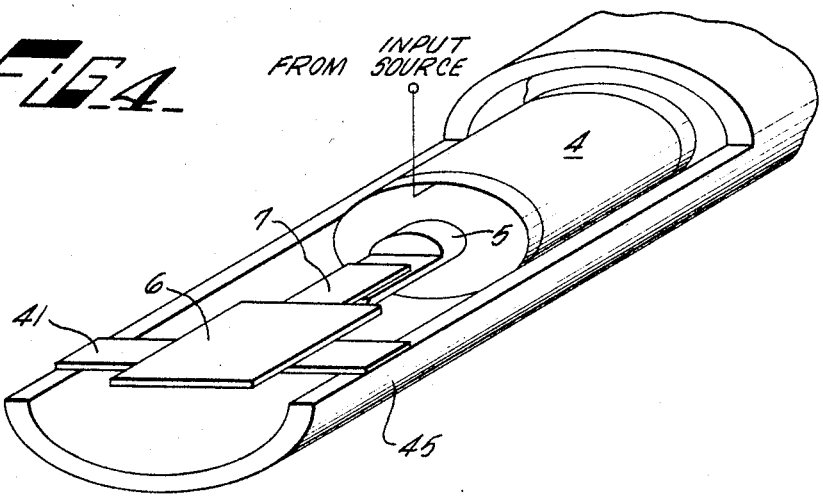
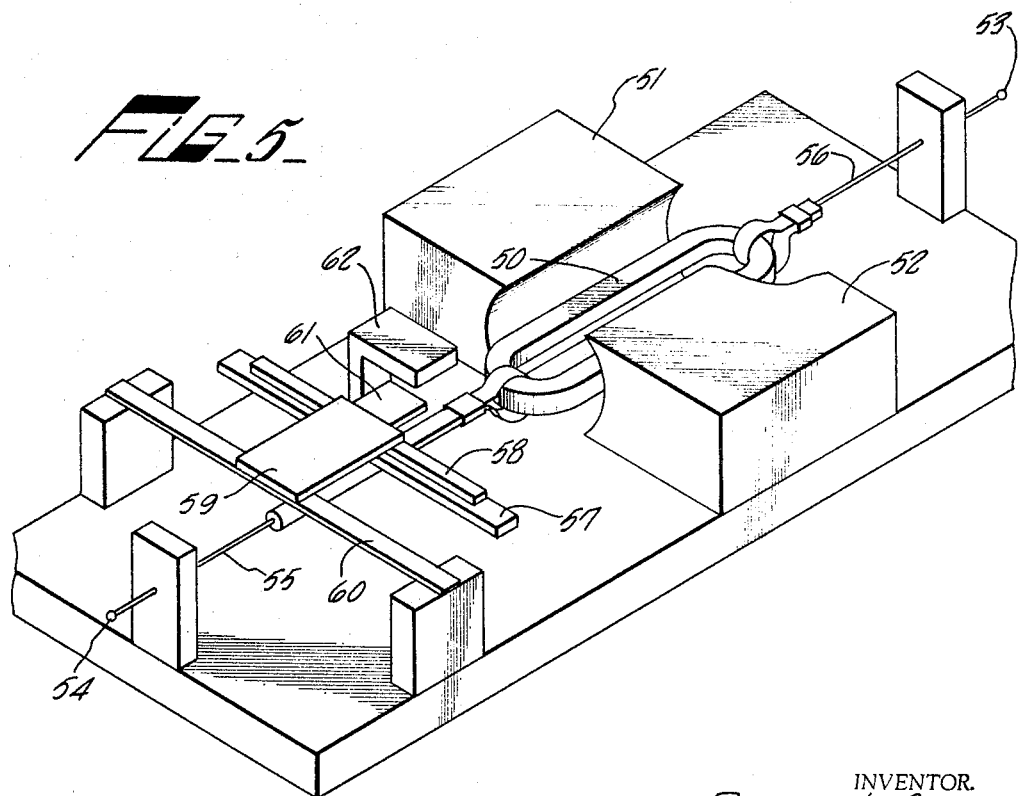
INVENTOR.
ROBERT L. CHENEY
BY
Christie, Parker & Hale
ATTORNEYS.

Oct. 11, 1966
R. L. CHENEY
3,278,941
EVENT MARKER GALVANOMETER
Filed Oct. 9, 1963
3 Sheets-Sheet 3
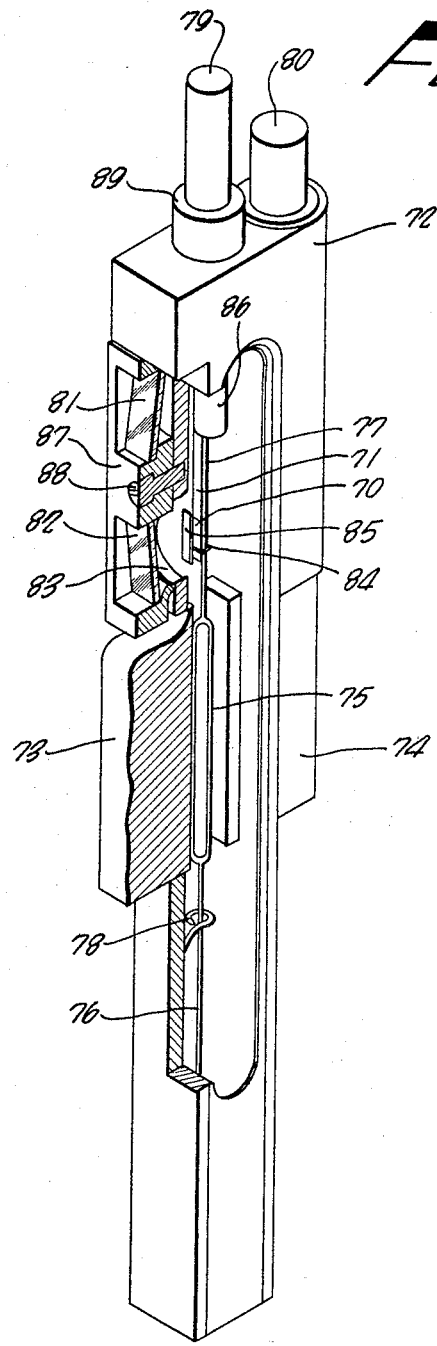
FIG_6_
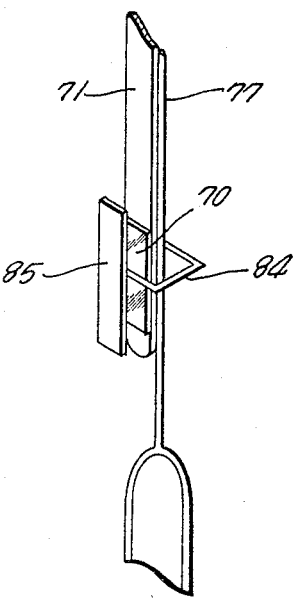
FIG_7_
INVENTOR.
ROBERT L. CHENEY
BY
Christie, Parker & Hale
ATTORNEYS.

3,278,941
Patented Oct. 11, 1966

3,278,941
EVENT MARKER GALVANOMETER
Robert L. Cheney, Arcadia, Calif., assignor to Consolidated Electrodynamics Corporation, Pasadena, Calif., a corporation of California
Filed Oct. 9, 1963, Ser. No. 315,066
6 Claims. (Cl. 346—109)

This invention relates broadly to an apparatus for marking the occurrence of events and, more particularly, to a galvanometer which marks events in response to digital signals.

Galvanometers are signal sensitive devices which have long been employed for measuring electric current signals in accordance with the magnetic effect produced by the electric current signal. An analogue observation of electric signal variations may be obtained by tracing the galvanometer-induced deflection of an indicating device such as a stylus or mirror on a recording medium. These analogue tracings subsequent to their storage on a recording medium may be interpreted in order to determine the detailed "history," so to speak, of the signal being monitored.

It has often been desirable to detect only when a signal above a predetermined minimum threshold signal level has been received. The history of such a signal may be recorded by an analogue galvanometer, and this history may be interpreted in order to determine when the signal exceeded the threshold level. However, this determination requires a mental appraisal of the history of the signal recording made with reference to standards which vary according to the sensitivity of the galvanometer, signal strength, etc. Furthermore, the use of analogue signals for this determination wastes considerable space on the recording medium. Accordingly, attempts have been made in the past to utilize electronic input circuitry in order to convert an analogue galvanometer into a digital galvanometer, or a galvanometer which records a single event. This input circuitry monitors the level of an input signal and provides electric current to the galvanometer only when the signal exceeds a predetermined minimum threshold level. In general, these attempts have proved unsatisfactory. In such operations, the galvanometer output is still analogue in nature for both the output from the electronic threshold circuit and for any signal variations above this threshold level. These signal variations result in a galvanometer trace which wastes a considerable portion of the recording medium. In addition, many uses require a precise digital record without the use of relatively complex input circuitry, which input circuitry consumes both unnecessary power and housing space.

The digital, or event galvanometer, of this invention overcomes the above-mentioned disadvantages of the prior art and provides a simple and efficient event marker which consistently produces, on a recording medium, fine line signals which indicate the start, stop, duration of events, or time between events. The event marker of this invention achieves the recording of these signals without the use of additional electronic input circuitry and represents a new and novel improvement in the event marking field.

In accordance with the principles of this invention, an event marker monitors a signal source which delivers an output signal that is assigned a predetermined minimum value indicative of the occurrence of an event. This event marker apparatus comprises a recording medium and a light reflecting device which is shielded from the recording medium in the absence of an event marking signal. A signal sensitive device is electrically connected to the signal source and is mechanically coupled to the reflecting means in order to focus the reflecting means on the recording medium only when input signals of at least said predetermined minimum are present.

In one embodiment of this invention, the light reflecting means comprises a mirror suspended in a tiltable position such that a light beam from a source of light is reflected, in the absence of an event marking input signal, away from a marking aperture leading to a light sensitive recording medium. A signal responsive device mechanically positions the mirror in a line of sight relationship with the marking aperture whenever a predetermined minimum input signal is received. This line of sight positioning of the mirror is held for the duration which the input signal exceeds the predetermined minimum.

In an alternative embodiment of this invention, the mirror is held in a fixed position which would reflect light from a source through a marking aperture except that a shutter, in the absence of an event marking signal, blocks the light before it can reach the marking aperture. When the input signal indicative of the ocurrence of a monitored event is received, the shutter is rotated out of its light-blocking position, and thus light is allowed to enter the marking aperture for recordation of the ocurrence of the monitored event.

The above features and advantages of the present invention will be understood more fully and clearly upon consideration of the following description and drawings in which:

FIG. 4 is a cutaway view in detail of one embodiment of the event marker galvanometer in accordance with this invention;

FIG. 5 is a detailed view of an alternative embodiment of an event marker in accordance with this invention;

FIG. 6 is another alternative embodiment of the event marker galvanometer of this invention; and FIG. 7 is an enlarged view of one portion of the embodiment of FIG. 6.

Figure 1:
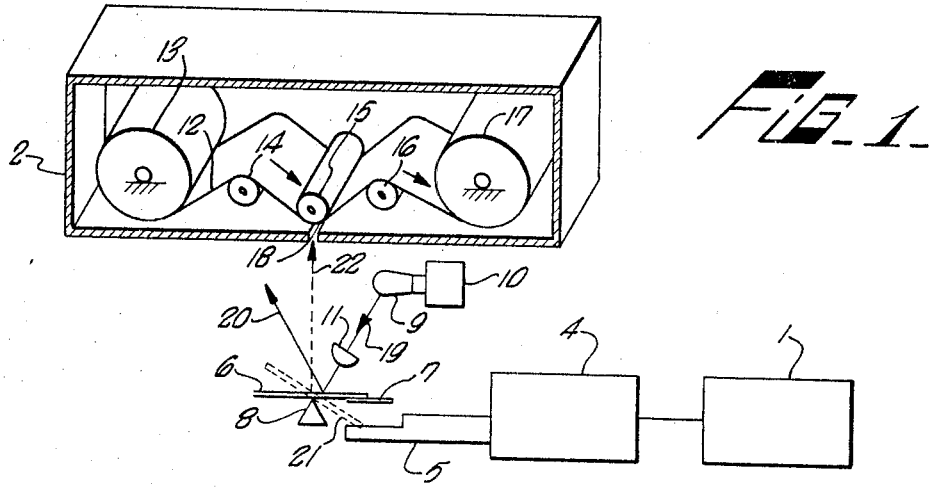
FIG. 1 is a digital event marker apparatus in accordance with the present invention.

An event marker galvanometer employing a recording medium 12 is shown in FIG. 1. The event marker of this figure is operative to detect the presence of a current above a predetermined minimum from source 1, and to record this detection on the medium 12. It should be understood that source 1, shown in block form, is representative of any event to be monitored which produces an electric signal. For example, an output from source 1 may indicate the closure of an electric circuit, or an output from source 1 may represent the occurrence of a mechanical event which has been translated into an electric signal in any known manner. The output from source 1 under these conditions is generally a step function signal which is coupled to an electromagnet 4. This electromagnet 4 has a soft iron core 5 which is positioned immediately below and normally magnetically separated from a light-reflecting means which includes a mirror 6. The mirror 6 is made responsive to a magnetic field induced into a soft iron core 5 by electromagnet 4 by way of a metal tab 7 which is attached to the mirror 6. The mirror 6 is hinged at a fulcrum support 8 about which it may rotate in a teeter-totter fashion.

A beam of light from source 9 having a power supply 10, is directed through a lens 11 onto the surface of mirror 6. This light beam, shown symbolically by arrow 19, is reflected from mirror 6 at an angle of reflection which is equal to the angle of incidence. This angle of incidence is chosen to normally place the reflected beam, shown as arrow 20, away from the marking aperture 18. A recording medium 12, which may be a continuous sheet of photosensitive paper, is positioned within a suitable shield 2, which shield excludes all extraneous light except that which is permitted admittance through a marking aperture 18. This photosensitive paper 12 is taken from a reeloff drum 13 and is pulled over idler rollers 14, 15 and 16 onto a pickup drum 17. Idler roller 15 is positioned immediately above the marking aperture 18 so that the photosensitive paper 12 is held in a recording position when light reflected from mirror 6 is directed through the marking aperture 18. A pinpoint beam of light admitted through aperture 18 exposes a single spot on recording medium 12 whenever the magnitude of current from source 1 is indicative of the occurrence of a monitored event. Since the drums 13 and 17 are operative to continuously move the recording paper 12, at any desired rate, past marking aperture 18, this pinpoint exposure will appear as a fine line trace for the duration of the input signal.

Operating in this manner two binary conditions for the event marking apparatus of FIG. 1 may be defined. For example, where no light impinges on the photosensitive paper 12 through marking aperture 18, a binary 0 is represented. This binary 0 indicates that the monitored event has not taken place. The other condition, representative of the occurrence of a monitored event, is a binary 1 which requires that light impinge on the recording paper 12 through marking aperture 18.

As mentioned hereinbefore, electromagnet 4 is in its normally deenergized position in the absence of current from source 1 and mirror 6 is in the position shown. Light from the source 9 will be reflected from mirror 6 in the direction of the solid arrow 20. This reflected light strikes the light shield structure 2. Thereafter, when current indicative of the happening of a monitored event is applied to electromagnet 4 by source 1, the soft iron core 5 is magnetized and attracts metal tab 7 to mirror 6. Mirror 6 is thus pulled down to the position shown by dotted lines 21. When the mirror 6 is in this position, light from source 9, shown as dashed arrow 22, passes through marking aperture 18 and onto the photosensitive paper 12. This light exposes a portion of the paper 12 thus recording the occurrence of a monitored event.

It should be noted in FIG. 1 that the mirror 6 has only two positions of interest; namely, the position of rest and the position shown by dotted line 21. The dotted line position will be assumed by mirror 6 only when a current of sufficient strength to activate electromagnet 4 is received from source 1. By varying the magnetic strength of electromagnet 4 in a known manner, the event marker of FIG. 1 may be adapted to operate only on signals which exceed a preset minimum magnitude.

Figure 2:
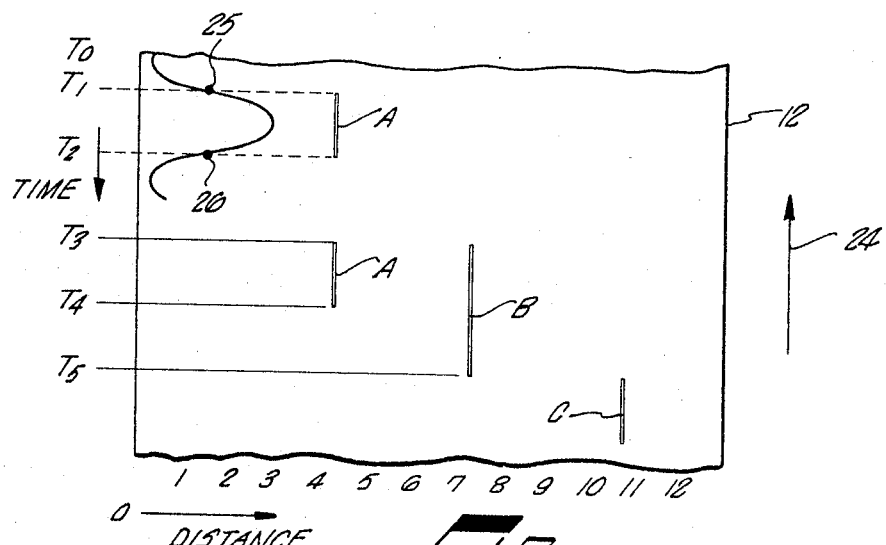
FIG. 2 is a pictorial diagram of a recording medium employed in the apparatus of FIG. 1.

A typical piece of photosensitive paper is shown in FIG. 2 in which the direction of motion from left to right in FIG. 1 is shown by arrow 24. The paper of FIG. 2 has its width divided into various tracks, or portions, which run the entire length of the paper. An event marker apparatus for a plurality of events would require several galvanometers which are assigned to various tracks on the recording paper of FIG. 2. Digital records for a plurality of events require that light impinge only on the portions of the paper assigned to the occurrence of particular ones of the several monitored events. For example, in FIG. 2 a line A, appearing at time $T_1$ between lines 4 and 5 indicates that one particular event being monitored has taken place. Many applications require both an analogue signal which, for example, may be representative of the velocity or acceleration of a device; and various digital signals which, for example, may be representative of the opening and closing of various electrical circuits within the device. Such an application is depicted in FIG. 2 wherein an analogue trace commencing at time $T_0$ is shown in the track portions of 1 through 3 as recorded by any standard galvanometer. Line A, representative of the occurrence of an event as recorded by the event marker of this invention provides a way of correlating, by intercept dots 25 and 26 at times $T_1$ and $T_2$, respectively, the digital event signal with the analogue movement signal.

As shown in FIG. 2, several different records from several different event marker galvanometers may be stored on the photosenstitve paper 12. For example, the lines A, B and C, indicative of three different monitored events are shown in FIG. 2. These three thin-line records are derived from three different event marker galvanometers which have separately monitored currents that exceed the predetermined minimum magnitude set for each of the galvanometers. The relative positioning of these three event marker galvanometers for recording the thin-line records A, B and C of FIG. 2 are shown in FIG. 3.

Figure 3:
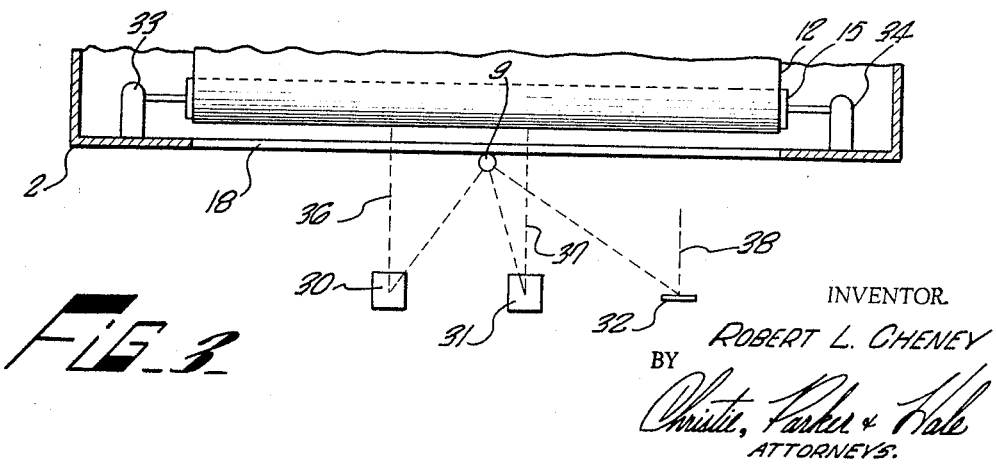
FIG. 3 is a pictorial diagram showing a plurality of event markers positioned at assigned portions, or tracks, of the recording medium of FIG. 2.

In FIG. 3 the event marker galvanometers are represented symbolically by mirrors 30, 31 and 32 which are present in each of the galvanometers. Additionally, in FIG. 3 there is shown a light source 9 positioned approximately midway between the edges of the photosensitive paper 12, although it should be understood that individual light sources for each of the event markers could be employed. A marking aperture 18 which runs the width of the light shield 2 is provided. Of course, individual apertures, one each, for each of the galvanometers, would work equally as well. The photosenstive paper 12 passes over roller 15 which is suspended between two bearing mounts 33 and 34 which are fastened to the light shield structure 2. Light from source 9 is reflected from each mirror 30, 31 and 32 onto the paper 12 or onto the light shielding surface 2, depending upon whether or not a monitored event has occurred. For example, in FIG. 3 mirrors 30 and 31 are shown moved to a position which allows reflected light beams 36 and 37 to pass through marking aperture 18 onto the photosensitive paper 12. Light beam 38 from mirror 32 misses marking aperture 18 and strikes the light shielding surface 2 as shown symbolically by the short length of beam 38. The record made by the event galvanometers 30 through 32 in the position shown in FIG. 3 is depicted in FIG. 2 at time $T_3$. As shown in that figure, a thin-line record A for event marker 30 and record B for event marker 31 are recorded. No record is present for event marker 32 at time $T_3$ since it is in its normal position indicative that the monitored event for that galvanometer has not yet taken place.

The event marker of FIG. 1 is shown in detail in FIG. 4. In FIG. 4, mirror 6 is suspended in a housing 45 by a thin flexible bar 41. Metal tab 7, attached to and extended from mirror 6, is positioned above the soft iron core 5 of electromagnet 4. Housing 45, including mirror 6, and electromagnet 4, are constructed as a unitary element so that it may be rotated with respect to the remainder of the galvanometer apparatus. Thus, in instances such as that shown for mirror 32 of FIG. 3, the mirror and electromagnet assembly may be adjusted so that light is reflected close to but not through a marking aperture 18 when the apparatus is in a binary 0 condition. In FIG. 4, an input current from source 1 serves to energize the electromagnet 4 and thereby to close a magnetic circuit which includes the soft iron core 5 and metal tab 7 upon the occurrence of an event which is being monitored.

An alternative embodiment of the galvanometer of this invention is shown in FIG. 5. This embodiment employs a D'Arsonval movement structure including a coil 50 positioned between magnetic pole pieces 51 and 52. An input signal applied to terminals 53 and 54 is coupled to coil 50 through the suspension which includes wires 55 and 56. When current from an input source is applied to these terminals 53 and 54, the coil 50 will rotate in the magnetic field between pole pieces 51 and 52 in a well known manner. Attached to the suspension system is a rod 57. Riding contiguously on this rod 57 is a shorter rod 58 which is attached to a mirror 59. The mirror is suspended from the housing by thin flexible bar 60. When coil 50 is rotated in the magnetic field by current flowing therein, the rod 57 will also rotate. Rotation of rod 57 will, through a cam action by contact of rods 57 and 58, cause the mirror 59 to be tilted in an upward direction until it engages the inverted L stop 62. When the tab 61 of mirror 59 engages stop 62, light from a source such as 9 of FIG. 1 is directed through an aperture onto a recording paper. Thus, stop 62 assures that signals of various amounts above a predetermined minimum which are applied to input terminals 53 and 54 always establish a binary signal of the same intensity and position on the recording paper.

A preferred embodiment of the event marker galvanometer of this invention is shown in FIG. 6. This galvanometer also employs the D'Arsonval movement principal of FIG. 5. Instead of having a tiltable mirror as employed in the galvanometers of FIGS. 4 and 5, the mirror 70 in FIG. 6 is maintained in a fixed position with respect to the housing 72 by support 71 which is fastened to circular bracket 86. This housing 72 may advantageously be one commonly employed in the galvanometer recording art and is shown for illustrative purposes only and is not, in any way, limiting. The housing includes a pair of magnetic pole pieces 73 and 74 positioned on opposite sides of a coil 75 in order to comprise the D'Arsonval movement structure. The coil 75 is suspended in the housing 72 by wires 76 and 77. Placed around wire 76 is a transverse vibration damper 78. Wire 77 is connected to an input terminal 79 and wire 76 is connected to an input terminal 80. When a source of input current is connected to these terminals current will flow through the coil 75 imparting a rotation thereto in the manner described hereinbefore with respect to FIG. 5.

The housing further comprises a pair of lenses 81 and 82 mounted in a lens plate 87 which may be interchangeably positioned above an aperture 83 by removal of set screw 88. These lenses 81 and 82 may have different focal points for focusing light upon mirror 70 in different modes of operation for the galvanometer.

The positioning of mirror 70 with respect to the D'Arsonval movement and suspension therefor is shown more clearly in FIG. 7. The mirror 70 is attached to a supporting arm 71 which, as mentioned hereinbefore, is held by a circular bracket 86 in a fixed position with respect to housing 72. This circular bracket 86 is coupled through housing 72 to a knob 89 in FIG. 6. Thus, after the galvanometer is inserted into an event monitoring apparatus, the light reflected by mirror 70 may be adjusted along the width of the recording papers to any desired one of the several recording tracks thereon.

A U-shaped bracket 84, in FIG. 7, has one end attached to the wire 77 below mirror 70 and the other end attached to a shutter 85 above the mirror. In the operation of the galvanometer of FIG. 6, input signals applied to the terminals 79 and 80 via a standard D'Arsonval movement rotate the shutter 85 away from the mirror 70 when the input signal exceeds a predetermined minimum magnitude. The rotation of shutter 85 out of its light-blocking position thus permits the recordation of an event on a photosensitive paper. By imparting a slight torsional tension to supporting wires 76 and 77, the shutter 85 may be held in a light-blocking position when noise signals or other signals less than a stepfunction signal, indicating the occurrence of an event which is being monitored, are received by the event marker. Shutter 85 is of a size chosen slightly larger than mirror 70 so that all light is blocked from the mirror until the occurrence of an event fully rotates shutter 85 out of its light-blocking position.

The above-described arrangements are illustrative of the principles of this invention. Numerous other arrangements may be devised by those skilled in the art without department from the spirit and scope of this invention.

What is claimed is:

1. In an instrument for recording signals from a signal source and having a light source and an elongated photosensitive recording surface movable along its length; the improvement comprising a stationary mirror disposed in the instrument and manually positionable to receive and reflect a light beam from the light source along a predetermined fixed path to impinge on the recording surface at a laterally fixed position, optical means positioned in the light beam for bringing the beam to a narrow focus at the recording surface, and shutter means for selectably interrupting the light beam, the shutter means being connected to the signal source and responsive to a variable signal therefrom, the shutter means being operable to prevent the light beam from reaching the recording surface along the fixed path when the variable signal has any magnitude smaller than a predetermined level, and being further operable to permit the light beam to reach the recording surface along the fixed path when the variable signal has any magnitude larger than the predetermined level, whereby a fine-line trace is recorded on the recording surface, the trace position being unaffected by variations in magnitude of the variable signal while it has a magnitude larger than the predetermined level.

2. The combination defined in claim 1, wherein the shutter means comprises a D'Arsonval movement connected to the signal source to rotate in response to the signal, and a shutter secured to the movement to move therewith in and out of the light beam.

3. An event-marker galvanometer for use in a recording oscillograph having a light source, an elongated photosensitive recording surface movable along its length, and means for producing a magnetic field; the galvanometer comprising a housing having an aperture and being adapted to be supported in the magnetic field, a stationary mirror adjustably secured to the housing and positioned manually positionable to receive and reflect a light beam from the light source through the aperture along a fixed path to impinge on the recording surface at a laterally fixed position, optical means positioned in the light beam for bringing the beam to a narrow focus at the recording surface, a coil suspended in the housing and adapted for connection to a source of a signal, the coil tending to rotate in the magnetic field in response to the signal, and a shutter secured to the coil and normally positioned to interrupt the light beam, the shutter moving with the coil whereby coil rotation in response to the signal moves the shutter out of the light beam and the light beam impinges on the recording surface at the laterally fixed position.

4. In an instrument for recording signals from a signal source and having a light source, an elongated photosensitive recording surface movable along its length, and a light shield positioned adjacent the recording surface and having an aperture, the improvement comprising: a mirror disposed in the instrument to receive and reflect a narrow light beam from the light source, mirror-mounting means secured to the instrument and to the mirror, the mirror-mounting means being movable from a first position in which the reflected light beam is directed away from the aperture to a second position in which the reflected light beam is directed through the aperture to impinge on the recording surface, the mirror-mounting means having a resilient element urging it into the first position, a stop member secured in the instrument adjacent the miror-mounting means for limiting travel of the miror-mounting means beyond the second position, and positioning means connected to the signal source and responsive to a variable signal therefrom, the positioning means being secured in the instrument and arranged to move the mirror-mounting means from the first position into the second position against the stop when the variable signal has any magnitude larger than a predetermined level, whereby the reflected light beam does not impinge on the recording surface when the variable signal has a magnitude smaller than the predetermined level; and the reflected light beam is directed through the aperture to expose a fine-line trace of laterally fixed position on the recording surface when the variable signal has any magnitude larger than the predetermined level, the trace position being unaffected by variations in magnitude of the variable signal while it has a magnitude larger than the predetermined level.

5. The improvement defined in claim 4 in which the positioning means comprises a metal tab secured to the mirror and an electromagnet connected to the signal source and oriented to attract the tab to move the mirror-mounting means into the second position when the variable signal has a magnitude larger than the predetermined level.

6. The improvement defined in claim 4 in which the positioning means comprises a D'Arsonval movement connected to the signal source and coupled to the mirror-mounting means whereby rotation of the movement in response to the variable signal causes the miror-mounting means to move to the second position when the variable signal has a magnitude larger than the predetermined level.

References Cited by the Examiner

UNITED STATES PATENTS

| | | | |
|---|---|---|---|
| 1,740,130 | 12/1929 | Von Voss et al. | 116—114.12 |
| 2,467,950 | 4/1949 | Thompson | 346—109 X |
| 2,604,955 | 7/1949 | Hawkins | 181—0.5 |
| 2,710,070 | 6/1955 | Mertin. | |
| 2,719,264 | 9/1955 | Murray | 346—109 X |
| 2,775,503 | 12/1956 | Peterson | 346—109 |
| 2,830,866 | 4/1958 | Warner | 346—66 |
| 2,874,353 | 2/1959 | Tavis | 324—97 |
| 2,875,017 | 2/1959 | Reynolds | 346—109 |
| 2,907,952 | 10/1959 | Beall et al. | 324—97 |
| 3,015,535 | 1/1962 | Clark | 346—109 |
| 3,045,241 | 7/1962 | Savit | 346—109 |
| 3,061,813 | 10/1962 | Geyer | 340—15.5 |
| 3,066,300 | 11/1962 | Widess | 346—109 |
| 3,107,138 | 10/1963 | LeMassena | 346—109 |
| 3,142,528 | 7/1964 | Stafford | 346—109 |

RICHARD B. WILKINSON, *Primary Examiner.*

LEO SMILOW, LEYLAND M. MARTIN, *Examiners.*

N. J. AQUILINO, J. W. HARTARY,
*Assistant Examiners.*

UNITED STATES PATENT OFFICE
CERTIFICATE OF CORRECTION

Patent No. 3,278,941                                October 11, 1966

Robert L. Cheney

It is hereby certified that error appears in the above numbered patent requiring correction and that the said Letters Patent should read as corrected below.

Column 6, line 36, strike out "positioned".

Signed and sealed this 5th day of September 1967.

(SEAL)
Attest:

ERNEST W. SWIDER                              EDWARD J. BRENNER
Attesting Officer                                    Commissioner of Patents